E. MOREWOOD & J. H. ROGERS.
APPARATUS FOR METAL-COATING IRON SHEETS.
No. 172,336. Patented Jan. 18, 1876.
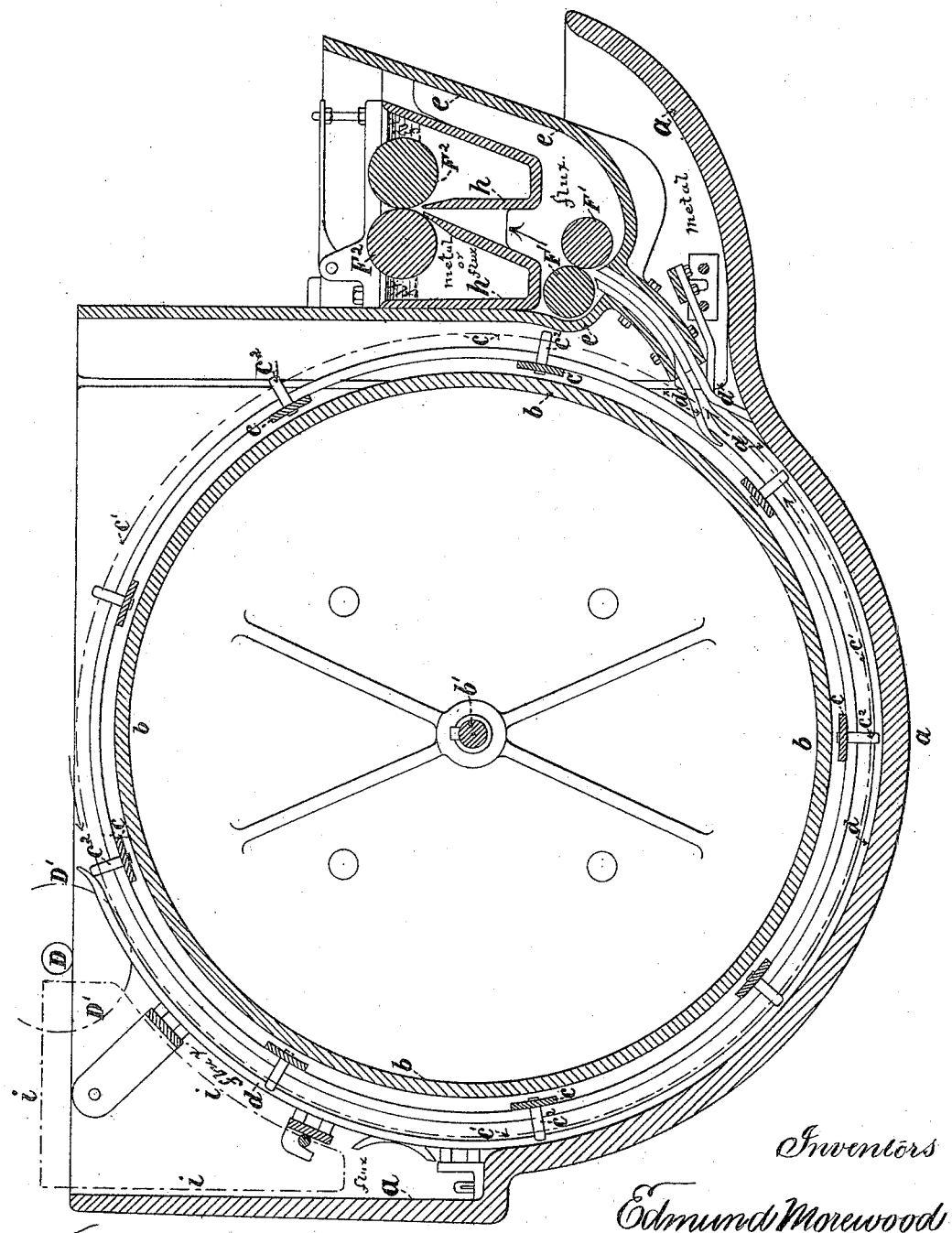

UNITED STATES PATENT OFFICE.

EDMUND MOREWOOD, OF LLANELLY, AND JOHN H. ROGERS, OF LLANGEN-NECH PARK, NEAR LLANELLY, GREAT BRITAIN.

IMPROVEMENT IN APPARATUS FOR METAL-COATING IRON SHEETS.

Specification forming part of Letters Patent No. 172,336, dated January 18, 1876; application filed December 27, 1875.

CASE No. 8.

*To all whom it may concern:*

Be it known that we, EDMUND MOREWOOD, of Llanelly, and JOHN HENRY ROGERS, of Llangennech Park, near Llanelly, both in the county of Carmarthen, Great Britain, tin-plate manufacturers, have invented certain improvements in Apparatus to be used in Tinning or Coating Sheets of Iron, or other metals, of which the following is a specification:

When sheets or plates of metal travel through melted coating, metal or flux, in the process of coating, it is desirable that the side or end of the plate which enters first should also leave the coating metal or flux first. Hitherto this has been generally accomplished by causing such plates to travel between rollers which are geared and driven by tooth-wheels. There are much wear and repair attending this mode of working, and a great deal of space in the tinning-bath which is not filled by the machinery would be vacant were it not filled with coating metal or grease. It is also desirable to have as little grease or metal in a heated state as possible in the process of coating.

These objects, and objects connected therewith, are attained by our invention, which we will proceed to describe with reference to the drawings, in which a vertical section of our apparatus is represented.

$a$ is the pot; it is heated by a furnace beneath. $b$ is a stationary iron drum within it, and occupying the greater part of its capacity. The drum $b$ is filled with bricks or other slow conducting material. The drum thus filled with slow conducting material keeps most of the heat at the bottom of the pot, while the upper part is comparatively cool. The drum is supported upon an axle, $b'$, about which the skeleton frame $c$ (or it might be a ring or rim) is able to revolve. The frame has two toothed rings $c^1 c^1$, and the pinions $D' D'$ (both shown by dotted lines) on the shaft $D$ gear with and drive them. The skeleton frame is provided with pins $c^2 c^2$, for carrying the plates forward. $d\ d$ are guides fixed within the pot, to guide the plates in their passage through. $e\ e$ is an exit flux-box containing two pairs of coated rollers, $F^1 F^1$ and $F^2 F^2$. The rollers of each pair are held in contact by spring-levers.

The open lower end of the flux-box $e$ dips into coating-metal in the pot $a$, and is thus sealed, and it is filled with grease or flux suitable for finishing the plates before they emerge from the coating pot or vessel. The flux covers the rollers $F^1 F^1$, but stands below the top level of the rollers $F^2 F^2$. The upper coated rollers $F^2 F^2$ revolve in troughs $h\ h$ containing melted coating-metal, and they have flux on the back suitable for keeping them clean and in good working order; or the troughs $h\ h$ may be filled with clean grease.

On the entrance side of the pot $a$ is flux. It is supported upon the coating-metal in the lower part of the pot, and its surface is within a few inches of the top of the drum $b$. There is thus a long narrow channel of grease on the entrance side of the pot, which at the top, where it is in contact with the air, is kept cool, the drum separating it from the heat of the coating-metal; but in descending this channel the temperature gradually increases until it reaches the best tinning-point at the bottom of the channel, where the grease rests in contact with the molten coating-metal.

The drum also, admits but of a narrow surface of molten metal being in contact with the grease, and so also deterioration of the grease is very much lessened. A hollow vessel, $i$, is indicated in dotted lines, and serves to lessen the grease-space in the pot $a$.

The plate is placed upon the upper part of the skeleton frame $c$, between the pins $c^2 c^2$, which are slightly above the surface of the grease. As the skeleton frame revolves the arms carry the plate forward into and through the grease, and it will be seen that the flux-space in which the grease is contained is of such extent that two or more plates are traveling through it at one time, so that time is given for the grease to act, and for the plate to become thoroughly heated, before it reaches the coating-metal. From and through this grease the plate travels into the melted coating-metal, through which it is still carried by the pins $c^2 c^2$, until it reaches the guide $d^x$, by which it is turned into the exit flux-box $e$, up and through which it passes into the lower rollers $F^1 F^1$, and thence into upper coated rollers $F^2 F^2$.

The rollers $F^1 F^1$ and $F^2 F^2$ travel at a surface speed about fifteen per cent. faster than that of the surface of the skeleton frame.

We claim as our invention—

The stationary drum $b$, in combination with the skeleton frame $c$, rotating in the annular space around it, and operating substantially as and for the purpose set forth.

EDMUND MOREWOOD.
    J. H. ROGERS.

Witnesses:
 I. BEACON PHILLIPS,
  *Bank, Llanelly.*
 B. WILLIAMS,
  *Servant to Mr. B. Jones, Llanelly.*